United States Patent [19]

Maughan et al.

[11] Patent Number: 5,672,024

[45] Date of Patent: Sep. 30, 1997

[54] PREPACKAGED BALL JOINT

[75] Inventors: Garth B. Maughan, Delta; Leane C. O'Daniel, Toledo, both of Ohio

[73] Assignee: Dana Corporation, Toledo, Ohio

[21] Appl. No.: 460,445

[22] Filed: Jun. 2, 1995

[51] Int. Cl.$^6$ .................................................. F16C 11/00
[52] U.S. Cl. ..................... 403/141; 403/122; 403/130; 403/135; 403/143
[58] Field of Search ..................... 403/122, 130, 403/133, 135, 141, 142, 143

[56] References Cited

U.S. PATENT DOCUMENTS

| | | | |
|---|---|---|---|
| 3,023,038 | 2/1962 | White | 287/87 |
| 3,141,231 | 7/1964 | Davies et al. | 403/122 X |
| 3,144,259 | 8/1964 | Haan | 403/122 X |
| 3,220,093 | 11/1965 | White | 29/149.5 |
| 3,237,278 | 3/1966 | White | 29/149.5 |
| 3,238,602 | 3/1966 | White | 29/149.5 |
| 3,329,454 | 7/1967 | Melton et al. | 403/130 X |
| 3,342,513 | 9/1967 | Melton et al. | 403/135 X |
| 3,343,857 | 9/1967 | Cislo | 403/138 X |
| 3,506,288 | 4/1970 | Gottschald | 403/135 X |
| 3,507,527 | 4/1970 | White | 287/87 |
| 3,559,265 | 2/1971 | Noris et al. | 29/200 |
| 4,360,284 | 11/1982 | Brandenburg | 403/133 |
| 4,410,295 | 10/1983 | Ersoy et al. | 403/122 |
| 4,714,477 | 12/1987 | Fichera et al. | 403/135 X |
| 4,986,688 | 1/1991 | Tuan et al. | 403/143 X |
| 5,066,160 | 11/1991 | Wood | 403/132 X |

FOREIGN PATENT DOCUMENTS 63-180717  7/1988  Japan ................................. 403/135

*Primary Examiner*—Blair Johnson
*Assistant Examiner*—Andrea Chop
*Attorney, Agent, or Firm*—Rader, Fishman & Grauer PLLC

[57] ABSTRACT

A prepackaged ball joint subassembly is adapted to be installed into a final housing that is then closed to retain the subassembly. The subassembly comprises a bearing and a stud with stud head and a shank which are received in an encasement. The encasement is then sealed. In one preferred embodiment, the encasement includes an upper hood with a lower hook and a lower bowl with an upper hook. One of the hooks extends radially outwardly and the other hook extends radially inwardly such that the upper hood and lower bowl may be snapped together without using special tools.

8 Claims, 2 Drawing Sheets

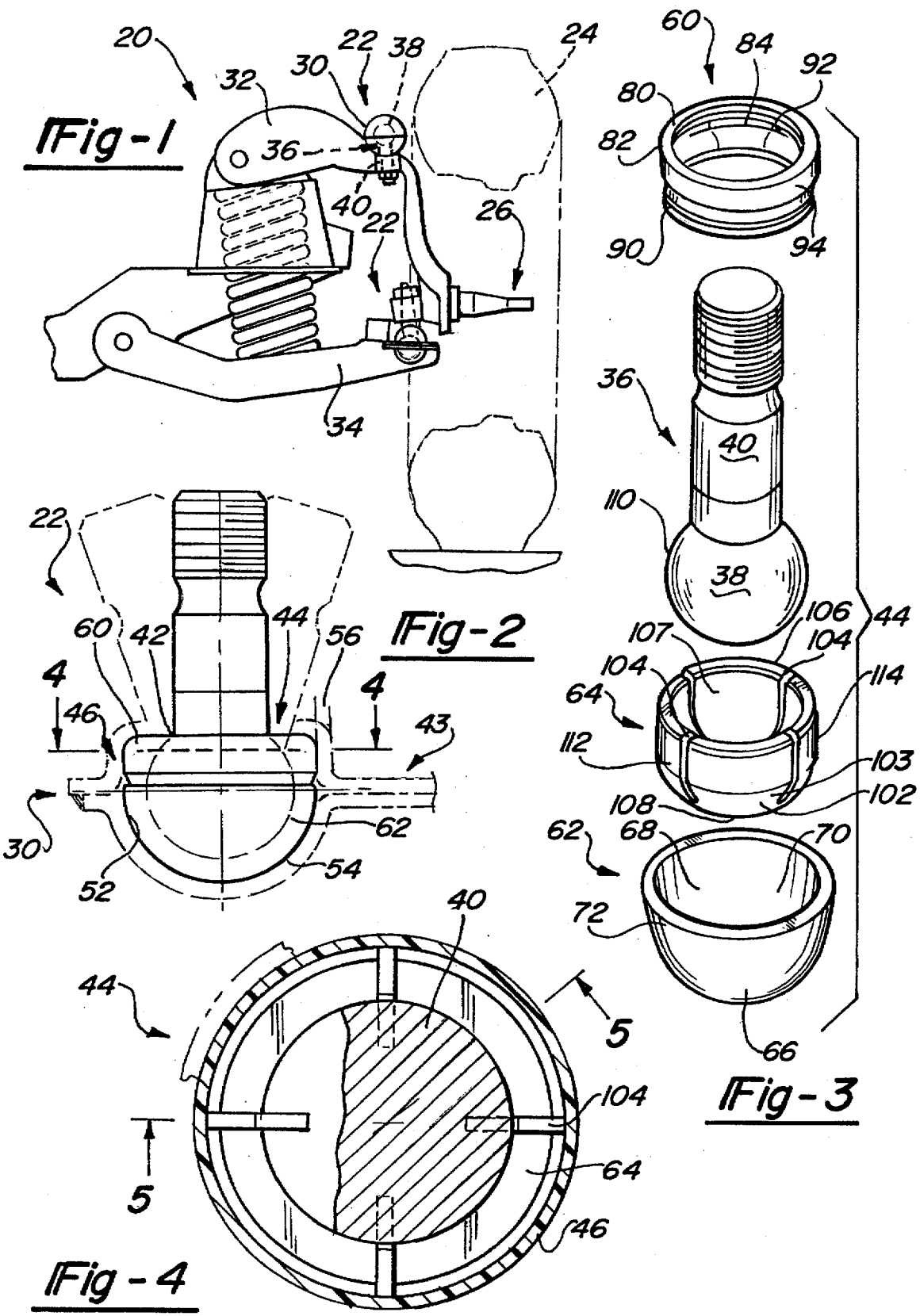

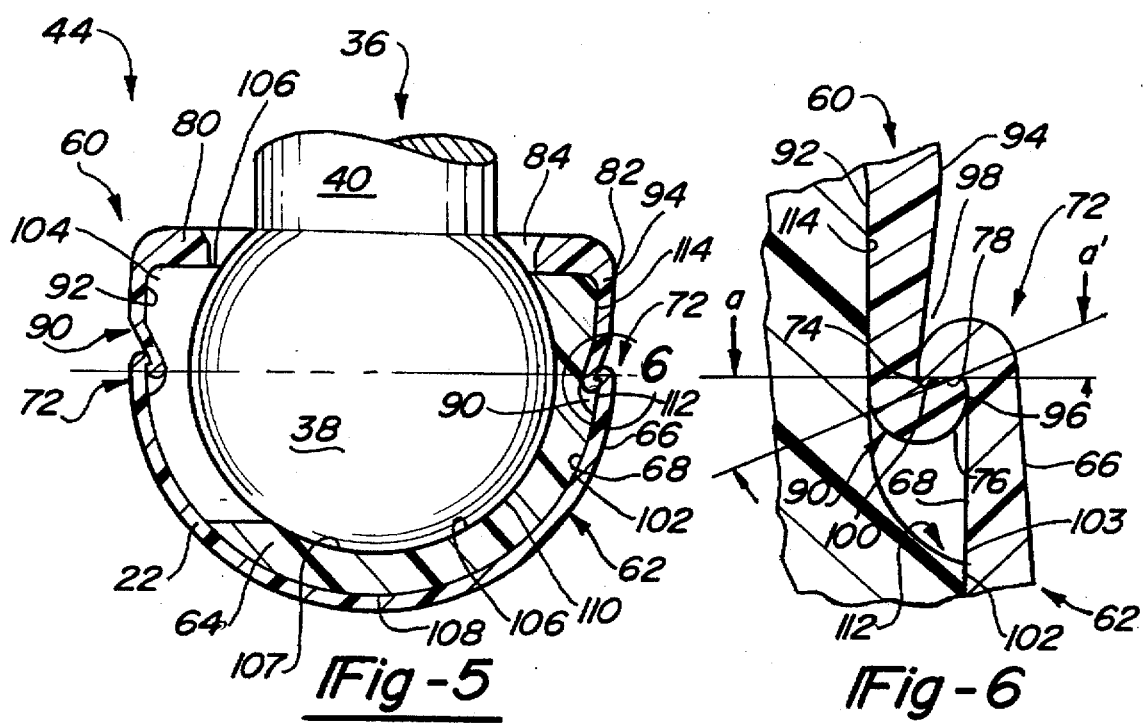
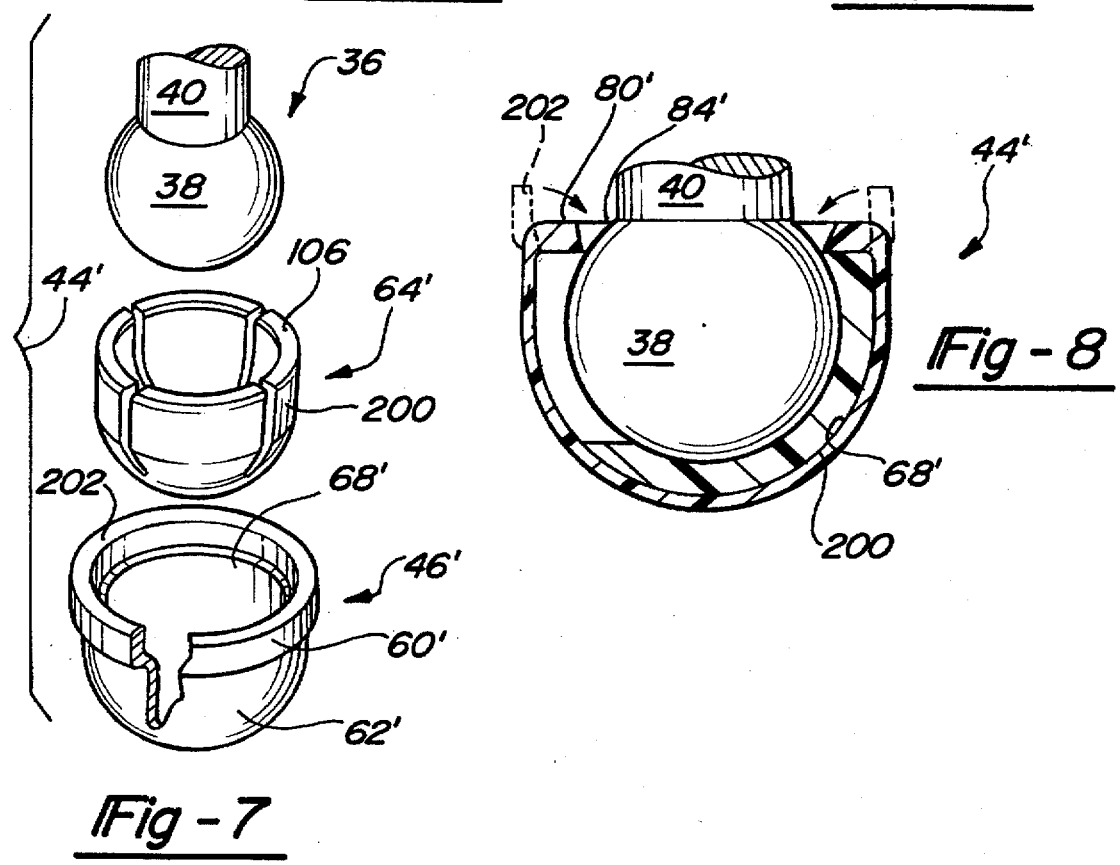

PREPACKAGED BALL JOINT

FIELD OF THE INVENTION

The present invention relates to a prepackaged ball joint that is subsequently incorporated into a final housing.

BACKGROUND OF THE INVENTION

Ball joint assemblies that include a housing for at least one bearing and a ball stud with a stud head and a shank are well known. However, such housings are typically attached to a mating part by way of welding or through the use of fasteners. Such means of housing attachment are subject to disadvantages including assembly mislocation and accidental separation during component operation.

Construction of a ball joint assembly as part of final assembly of a component such as an automotive wheel control arm is often undesirable since it requires additional time and particular caution. Ball joint assemblies are subject to contamination during their construction, resulting in ball joint failure. Additionally, each assembly must be customized for its particular application, increasing expense.

SUMMARY OF THE INVENTION

An inventive pre-packaged ball and joint subassembly is adapted to be inserted into a final housing. The subassembly comprises a stud with a stud head and a shank. The stud head is snapped into a bearing having an inner seat face. To promote insertion of the stud head into the bearing, the bearing preferably includes a plurality of axially extending slots. Then the stud and bearing are inserted into an encasement, and the encasement closed. The stud is restrained to articulation by the encasement. Finally, the subassembly is inserted into the housing and the housing is then sealed. In a preferred embodiment, the housing applies a compressive lead on the subassembly which is transmitted to the bearing and stud to prevent unwanted play.

In a preferred embodiment, the encasement comprises an upper hood with a lower hook shaped rim and a lower bowl with an upper hook shaped rim. Alternatively, a plurality of distinct hooks may be used. The upper hood is adapted to engage the bearing, the lower hook flexing radially outwardly before it is received in a bearing pocket. Preferably, the hook has residual radial compression to prevent accidental separation of the hood from the bearing. Then the upper hook of the lower bowl engages the upper hood, the upper hook flexing radially outwardly before it snaps into the upper hook. As with the lower hook, it is also preferable that the upper hook has residual radial compression to prevent accidental separation of the bowl from the hood.

In an alternative embodiment, the encasement is only one element, upper axial lips of the encasement being deformed to form an end wall that retains the stud and bearing.

There are a number of advantages to a ball joint assembly having both an encasement and a final housing. The subassembly may be constructed at a location remote from the final assembly area of the part incorporating the ball joint, reducing the possibility of unwanted contamination which would interfere with ball joint operation. Often the subassembly can be hand assembled without the need for additional tools. In addition, the same subassembly may be used with a number of different final assemblies, as long as the final housing is similar. Finally, the housing can more easily be an integral component of the part incorporating the ball joint, allowing more consistent positioning and a reduced likelihood of unwanted housing separation.

BRIEF DESCRIPTION OF THE DRAWINGS

The features and inventive aspects of the present invention will become more apparent upon reading the following detailed description, claims, and drawings, of which the following is a brief description:

FIG. 1 is a side view of an automotive control arm assembly incorporating the present invention.

FIG. 2 is a side view of a ball joint assembly incorporating a first subassembly embodiment.

FIG. 3 is an exploded perspective view of the first embodiment.

FIG. 4 is a plan, partial cross-sectional view of the first embodiment, viewed in the direction of arrows 4—4 of FIG. 2.

FIG. 5 is a partial cross-sectional side view of the first embodiment in the direction of arrows 5—5 in FIG. 4.

FIG. 6 is an enlarged partial cross-sectional view within encircled region 6 in FIG. 5.

FIG. 7 is an exploded perspective view of a second subassembly embodiment.

FIG. 8 is a partial cross-sectional side view of the second embodiment.

DETAILED DESCRIPTION OF A PREFERRED EMBODIMENT

An automotive control arm assembly 20 is illustrated in FIG. 1 that includes two ball and socket assemblies 22 incorporating the present invention. A wheel assembly 24, shown in phantom and in simplified form, is rotatably mounted in conventional fashion on spindle sub-assembly 26. Spindle subassembly 26 is secured to control arm assembly 20 by means of ball and socket assemblies 22. Each ball and socket assembly 22 includes a housing 30 that is permanently secured to upper control arm 32 or lower control arm 34. A stud 36, received within housing 30, includes a head 38 and a shank 40. If full articulation is desired, stud head 38 is preferably spherical. However, other shapes may be desired if the freedom of movement of stud 36 needs to be constrained. For example, stud head 38 should be generally cylindrical if rotational motion about only a single axis is desired. Housing 30 has an aperture 42 through which shank 40 passes and extends away to engage and be secured to spindle subassembly 26.

Stud 36 is limited to articulation within housing 30, as illustrated in phantom in FIG. 2. Preferably, housing 30 is part of a two-piece unitized sandwiched stamping 43 forming an integral part of upper or lower control arms 32,34 in the illustrated embodiment. Thus, housing 30 has the advantage of being consistently positioned within assembly 20 with the additional advantage of a reduced likelihood of housing separation when compared to known welding or fastening methods.

Stud 36 is part of a prepackaged subassembly 44 with a separate and distinct unsecured armless encasement 46 that is received within housing 30. Subassembly 44 provides a number of advantages over the prior art. First, subassembly 44 can be easily constructed by hand without requiring special tools. Welding and separate fasteners are not required. As discussed further below, the manner of construction eliminates the accidental separation of components. Subassembly 44 can be constructed at a remote location where contamination risk is reduced, and then transferred as a unit to a final assembly location for insertion into housing 30. Further, the same subassembly may also be used in a wide variety of final ball joint assemblies 22, wherein the size of housing 30 is controlled.

Subassembly 44 is easily inserted into and secured by housing 30. An inner surface 52 of housing 30 corresponds to and is in substantial facial contact with an outer surface 54 of encasement 46 to limit movement of the encasement within housing 30. Housing 30 includes an axial lip 56 which is bent from an axial orientation to a radially inwardly directed orientation to form an end wall with aperture 42. As discussed above, shank 40 passes through aperture 42. Once lip 56 is deformed, subassembly 44 is tightly sealed within housing 30. In a preferred embodiment, housing 30 applies a continuous force upon encasement 46 such that subassembly 44 is compressed within the housing, restraining the subassembly and eliminating unwanted play in the articulating movement of stud 38.

A first preferred embodiment for a prepackaged ball joint assembly 44 is illustrated in greater detail in FIGS. 3 through 6. As best illustrated in the exploded perspective view of FIG. 3, encasement 46 comprises an upper hood 60 and a lower bowl 62. Preferably, encasement 46 is formed from thin and easily flexed strip steel. At least one bearing 64 and stud head 38 is located within encasement 46. Bearing 64 may be formed from any one of a number of synthetic materials known to one skilled in the art. Hood 60 and lower bowl 62 are snapped together, as shown in cross-section in FIGS. 5 and 6. Because any necessary compression pre-load is preferably provided by housing 30, hood 60 and bowl 62 can usually be assembled by hand. Machine closure is not required. In the illustrated embodiment, hood 60, bowl 62, and bearing 64 are annular. While preferred, such an annular shape is not necessarily required as long as stud 36 is encased within subassembly 44 such that it is limited to the articulation appropriate to the stud head used.

Lower bowl 62 of encasement 46 has an outer surface 66, an inner surface 68 defining an inner chamber 70, and an upper hook shaped rim 72. As illustrated in FIGS. 5 and 6, upper hook shaped rim 72 extends radially inwardly from inner surface 68 and terminates at a radially inner tip 74. A generally v-shaped groove 76 is defined by a surface 78 extending between tip 74 and inner surface 68, and inner surface 68 itself. Preferably, surface 78 extends at an angle "a" below a radially extending axis. One preferred angle "a" is approximately 10 degrees. In the illustrated embodiment, hook shaped rim 72 extends about the entire periphery of bowl 62. To permit the selective flexing of hook shaped rim 72, as discussed further below, the wall thickness of bowl 62 preferably tapers in the region comprising hook shaped rim 72, becoming the thinnest near the vertex of groove 76. Finally, the axial end of hook shaped rim 72 is preferably rounded to prevent unwanted binding during installation.

Hood 60 of encasement 46 includes an upper end wall 80 with an outer periphery 82 and an aperture 84 to receive shank 40 of stud 36. Alternatively, an aperture may be defined in lower bowl 50 to receive shank 40. As best shown in FIGS. 5 and 6, hood 60 extends generally axially from endwall 80 and terminates at a lower hook shaped rim 90. Hood 60 includes a radially inner surface 92 and a radially outer surface 94. While lower hook shaped rim 90 is preferably angled radially inwardly, it terminates at a radially outer tip 96. Preferably, tip 96 is located radially inwardly of outer periphery 82. A generally v-shaped groove 98 is defined by a surface 100 extending between tip 96 and outer surface 94, and outer surface 94 itself. Preferably, surface 100 extends at an angle "a'" above a radially extending axis, wherein the value of angle "a'" corresponds to angle "a" of upper hook shaped rim 72 to promote engagement between the hooks as illustrated in FIG. 6. Lower hook shaped rim 90 extends about the entire periphery of hood 60. To permit the selective flexing of hook shaped rim 90, as discussed further below, the wall thickness of bowl hood 60 preferably tapers in the region comprising lower hook shaped rim 90, becoming the thinnest near the vertex of groove 98. Finally, the axial end of hook shaped rim 90 is preferably rounded to prevent accidental binding during installation.

Bearing 64 is received within inner chamber 70 of bowl 62 and has a lower outer surface 102 that corresponds to and substantially mates with inner surface 68 of bowl 62. Outer lower surface 102 terminates at an edge 103. Bearing 64 also has an upper outer surface 114 that mates with surface 92 of hood 60. Bearing 64 includes a plurality of axial slots 104 that extend from an upper axial rim 106 toward an opposing lower axial end 108. In the illustrated embodiment, four slots are equally spaced about the periphery of bearing 64. Slots 104 allow bearing 64 to temporarily deform upon the insertion of stud head 38 into bearing 64 to create a tight fit between an inner bearing seat face 107 and an outer surface 110 of stud head 38, maximizing the area of contact between the bearing and stud head and minimizing accidental separation.

Bearing 64 includes a recessed pocket 112, the lower boundary of which is defined by edge 103. Pocket 112 is adapted to receive lower hook shaped rim 90 and a portion of upper hook shaped rim 72. As a result, when hood 60 and bowl 62 are snapped together, outer surface 66 of lower bowl 62 is generally coplanar with radially outer periphery 82 of hood 60 in the region of hook shaped rim 72. Thus, subassembly 44 is more easily inserted into housing 30. The region corresponding to hook shaped rims 72 and 90 is preferably axially positioned to correspond with the region of material separation of stamping 43, shown in FIG. 2. Thus, the existence of hook shaped rims 72 and 90 is not detrimental to the performance of assembly 22 since the area of contact between encasement 42 and housing 30 is maximized.

To make assembly 22, stud head 38 is snapped into bearing 64 such that the head engages seat face 107. Bearing 64 is temporarily deformed through the use of slots 104. Then shank 40 is inserted through aperture 84 of hood 60 and the hood lowered toward bearing 64. To snap hood 60 and bearing 64 together, lower hook shaped rim 90 is temporarily flexed radially outwardly before it is received in pocket 112. Flexing is eased by reducing the material thickness in the region of hook shaped rim 90, as discussed above. When hood 60 is mated with bearing 64, bearing rim 106 preferably engages end wall 80 to limit stud play. Additionally, lower hook shaped rim 90 is preferably in compressive facial contact with the surface 114 to prevent the accidental separation of hood 60 from bearing 64 before assembly is complete.

Encasement 46 and subassembly 44 is completed by snapping lower bowl 62 to upper hood 60. Upper hook shaped rim 72 temporarily flexes radially outwardly to engage hook shaped rim 90 such that tip 74 is received in groove 98 and tip 96 is received in groove 76. Again, flexing is eased by reducing the material thickness in the region of hook shaped rim 72, as discussed above. Once snapped together, hook shaped rim 72 preferably has a residual compressive force directed radially inwardly to prevent the accidental separation of encasement 76.

Finally, subassembly 44 is inserted into housing 30, and lips 56 deformed, as discussed above. Then, ball joint assembly 22 is complete.

An alternative embodiment of the present invention, a prepackaged ball joint subassembly 44' is illustrated in FIGS. 7 and 8. Subassembly 44' comprises stud 36, a one-piece bearing 64' and a one-piece encasement 46'.

Bearing 64' is essentially the same as bearing 64 except there is no recessed pocket 112. As a result, there is a continuous outer surface 200 that terminates at axial end 106. Stud head 38 is snapped into bearing 64' as discussed above with respect to bearing 64.

Encasement 46' includes a lower bowl portion 62' and an integral upper hood portion 60', the encasement having an inner surface 68' defining an inner chamber 70'. Upper hood portion 60' extends axially away from lower bowl portion 62' and terminates at an upper axial lip 202. As shown in phantom in FIG. 8, once bearing 64' and stud 38 are installed in encasement 64' with bearing outer surface 200 conforming to encasement inner surface 68', lip 202 is bent radially inwardly to seal subassembly 44'. Lip 202 defines an end wall 80' with an aperture 84' through which shank 40 passes.

Subassembly 44' may require special tools to be assembled. However, the resulting subassembly is nearly contamination proof. In addition, compression pre-load may be more easily applied to bearing 64'.

Preferred embodiments of the present invention have been disclosed. A person of ordinary skill in the art would realize, however, that certain modifications would come within the teachings of this invention. While a lower control arm assembly is illustrated, the present invention may be used in many different environments. More particularly, the hook orientation and order of assembly of the two-piece encasement may be modified in a number of ways. Further, distinct circumferentially spaced hooks rather than a continuous hook shaped rim may be used. More than one bearing may be used. A retainer ring may also be appropriate between the subassembly and the end wall of the housing before the housing is sealed. Alternatively, a retainer ring may be appropriate between the bearing and end wall of the encasement. Therefore, the following claims should be studied to determine the true scope and content of the invention.

What is claimed is:

1. A prepackaged ball joint subassembly adapted to be installed into a final housing, said subassembly comprising:

an encasement having an inner chamber defined therein and an end wall at an upper axial end of said encasement, wherein said encasement comprises an upper hood with a lower hook means and a lower bowl with an upper hook means, one of said hook means extending radially outwardly and the other of said hook means extending radially inwardly such that said upper hood and said lower bowl are snapped together by means of said hook means;

a bearing received in and having an outer surface corresponding to the confines of said inner chamber, said bearing including an inner seat face; and a stud with a stud head and a shank, said head engaging said seat face, wherein said stud is articulatingly retained in said encasement by said end wall, wherein said hood and said bowl include annular portions, each of said hook means including an annular groove, wherein at least one of said lower and upper hook means is adapted to temporarily flex when said upper hood and said lower bowl are snapped together, and wherein said bearing includes a lower outer surface terminating at an upper edge, an upper rim, and a recessed pocket located between said upper edge of said lower outer surface and said upper rim, said pocket adapted to receive said hook means such that a radially outer surface of said hood is generally coplanar with a radially outer surface of said bowl.

2. A subassembly as recited in claim 1, wherein said end wall includes an aperture, said shank extending through said aperture and away from said encasement.

3. A subassembly as recited in claim 1, wherein one of said upper and lower hook means temporarily flexes radially outwardly to engage said pocket such that one of said hood and said bowl is secured to said bearing.

4. A subassembly as recited in claim 1, wherein said rim is in facial contact with said end wall of said encasement.

5. A prepackaged ball joint subassembly adapted to be installed into a final housing, said subassembly comprising:

an encasement having an inner chamber defined therein and an end wall at an upper axial end of said encasement, wherein said encasement comprises an upper hood with a lower hook means and a lower bowl with an upper hook means, one of said hook means extending radially outwardly and the other of said hook means extending radially inwardly such that said upper hood and said lower bowl are snapped together by means of said hook means, said hood and said bowl including annular portions, each of said hook means including an annular groove, at least one of said lower and upper hook means adapted to temporarily flex when said upper hood and said lower bowl are snapped together;

a bearing received in and having an outer surface corresponding to the confines of said inner chamber, said bearing including an inner seat face, wherein said bearing includes a lower outer surface terminating at an upper edge, an upper rim, and a recessed pocket located between said upper edge of said lower outer surface and said upper rim, said pocket adapted to receive said hook means such that a radially outer surface of said hood is generally coplanar with a radially outer surface of said bowl; and a stud with a stud head and a shank, said head engaging said seat face, wherein said stud is articulatingly retained in said encasement by said end wall.

6. A subassembly as recited in claim 5, wherein one of said hook means comprise a single hook.

7. A subassembly as recited in claim 5, wherein at least one of said hook means comprises a plurality of circumferentially spaced hooks.

8. A subassembly as recited in claim 5, wherein at least one of said hook means comprises a continuous hook shaped rim.

* * * * *

UNITED STATES PATENT AND TRADEMARK OFFICE
CERTIFICATE OF CORRECTION

PATENT NO : 5,672,024
DATED : September 30, 1997
INVENTOR(S) : Garth B. Maughan and Leane C. O'Daniel It is certified that error appears in the above-identified patent and that said Letters Patent is hereby corrected as shown below:

Col. 6, line 21
 replace "bail"
 with --ball--.

Signed and Sealed this

Twenty-sixth Day of May, 1998

*Attest:*

BRUCE LEHMAN

*Attesting Officer*     *Commissioner of Patents and Trademarks*